Aug. 3, 1954
H. HUGONNET
2,685,119
METHOD OF MANUFACTURING PIECES MADE OF
COMPOSITE OR AGGLOMERATED MATERIALS
Filed Nov. 28, 1951
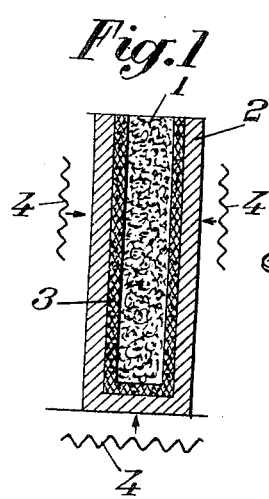
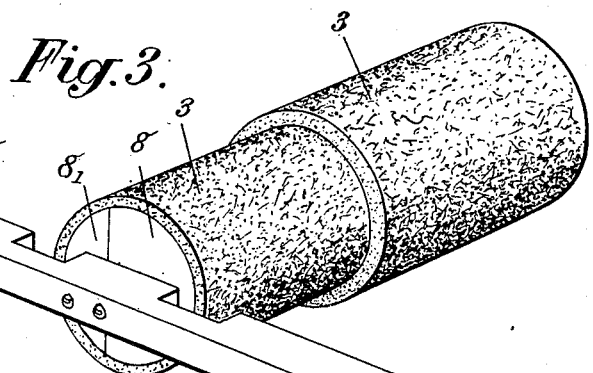
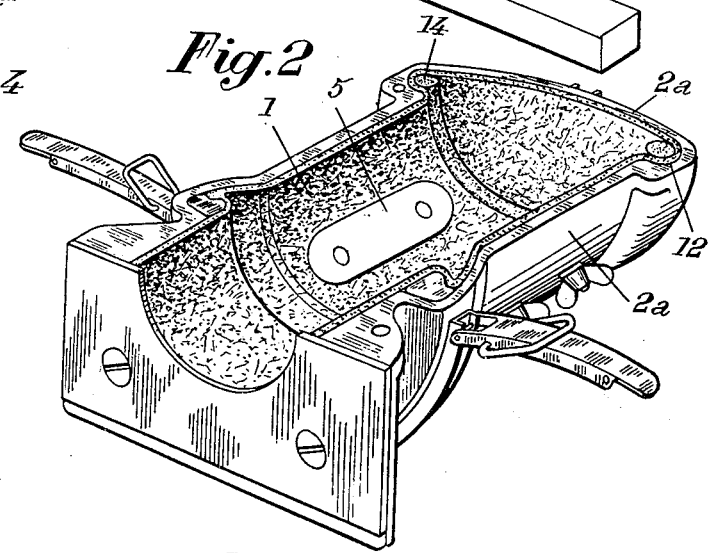
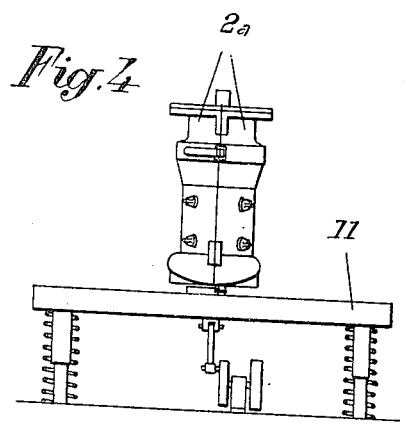
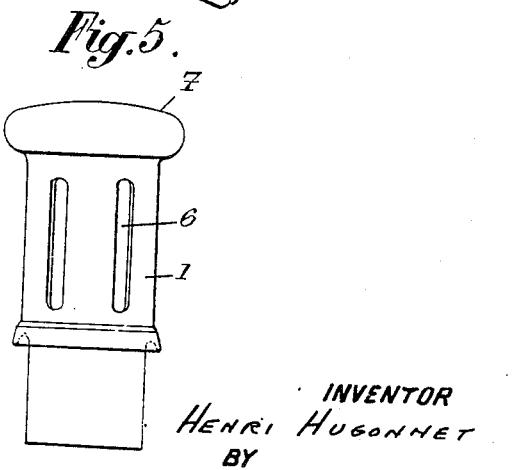
INVENTOR
HENRI HUGONNET
BY
Haseltine, Lake & Co.
AGENTS Patented Aug. 3, 1954

2,685,119

UNITED STATES PATENT OFFICE 2,685,119

METHOD OF MANUFACTURING PIECES MADE OF COMPOSITE OR AGGLOMERATED MATERIALS

Henri Hugonnet, Poissy, France, assignor to Societe du Fibrociment et des Revetements Elo, Poissy, France, a society of France Application November 28, 1951, Serial No. 258,663

Claims priority, application France December 1, 1950

1 Claim. (Cl. 25—155)

The present invention relates to methods of manufacturing pieces made of composite or agglomerated materials consisting chiefly of hydraulic binders, that is to say concrete, either reinforced or not, or the like, and said invention is more particularly but not exclusively concerned with materials of this kind in which fibres, for instance of asbestos, are mixed with said hydraulic binder.

The chief object of my invention is to provide a method of this kind which is better adapted to meet the requirements of practice than those used for the same purpose up to the present time, and in particular which makes it possible to reduce the time of manufacture and the cost thereof while supplying pieces which are both homogeneous and strong.

According to my invention, the pieces are obtained by placing in suitable molds the composite matter containing an excess of water, in subjecting the matter in the mold to a vibrating or similar action in order to increase the density of said matter by causing the excess of water to depart therefrom, and in collecting this excess of water as it is being evacuated from the matter into suitable means along the walls of the mold, said excess of water being temporarily kept in said mold.

Other features of my invention will result from the following detailed description of some embodiments thereof, with reference to the accompanying drawings, given merely by way of example, and in which:

Fig. 1 diagrammatically shows in section a mold for carrying out the method according to my invention;

Figs. 2 and 3 are perspective views, respectively, of one half of a mould and the core intended to be placed therein, for carrying out the method according to my invention;

Fig. 4 diagrammatically shows, in elevational view, the whole of a mold and means for vibrating it;

Fig. 5 shows the molded piece obtained by means of the mold of Fig. 2.

Pieces of mixed concrete (or the like) and fibres (and especially asbestos), such as plates, pipes and other objects, are obtained from a mass having a relatively high fluidity, that is to say containing an excess of water, for instance from 20 to 30 per cent, because such a fluidity is necessary in order to obtain an intimate mixing and a uniform distribution of the fibres in the binder. This made the manufacture of such pieces rather difficult and it was necessary, for instance, to obtain first plates formed on rotating cylinders dipping in the fluid material (Hatchek process, etc.), which plates were then either used as such or shaped to constitute objects of various kinds.

According to an embodiment of my invention, given by way of example, illustrated by Fig. 1, the raw material, i. e. a relatively fluid mass constituted as above stated is poured in a mold at least some of the walls 2 of which are lined with at least one layer 3 of an absorbing material (or of different absorbing materials).

The mold, or at least some of the walls thereof, in particular its lower wall, is subjected to a vibratory action diagrammatically illustrated at 4.

Of course, while the mold is shown vertical, it might as well be horizontal. And in this case there might be only one wall 2 located under the plate to be molded, the other wall 2 being then at least partly dispensed with.

Concerning the absorbing material 3, it may be constituted by a spongy substance such as felt (of any suitable kind), blotting paper or the like, an absorbing cloth (preferably thick), spongy or microporous rubber, a matter of the kind used for making artificial sponges (in particular that commercially known as "Spontex"), and so on.

The thickness of these absorbing layers and their nature are determined in accordance with the mass of matter 1 distributed along the walls of the mold and with the proportion of water to be absorbed during the vibration operation. For instance, in the case of plates of a mixture of cement and asbestos of a thickness of about 10 mm., I may use on the two opposed faces of the mold layers of felt of a thickness ranging from 3 to 4 mm. I might also provide a felt layer on only one of said faces, this layer being then thicker, for instance 5 mm. thick.

As a rule, it is useful to keep water in these layers during the vibrating operation and until the molded piece is removed from the mold, because water, since it is not compressible, tends to keep the absorbing layers at their normal thickness as it is absorbed into these layers. This water therefore makes these layers somewhat rigid, which enables matter 1 to be packed tight and compressed in the mold, without deformation and without forming air bubbles or the like.

It should also be noted that while the cement is setting (when the binder consists of cement), the water absorbed in the above mentioned layers serves to keep the piece or object to be molded in a moist envelope, which is favorable to its hardening, its setting and its resistance. Besides, a portion of this water may be reabsorbed by the piece so as to compensate, in the matter thereof, for the amount of water necessary for crystallization of the cement.

The vibratory treatment depends of course (in particular as to its frequency and amplitude) upon the nature of the pieces to be molded. Hypersonic frequencies may be used.

This method of manufacturing such pieces is much quicker than those used up to this time, which of course reduces the cost.

The pieces obtained through this method are very homogeneous and very strong, due to their high compacity. Their surface is particularly smooth. They can be removed from the mold without difficulty. It should be noted, in particular, that the absorbing layers, after having been made rigid by the absorption of water during the vibratory treatment, again assume a slight elasticity when a portion of the water is reabsorbed by the piece, after crystallization of the cement, which facilitates removal from the mold, especially when the mold contains cores (case of the manufacture of pipes).

I will now describe, in a more detailed manner, with reference to Figs. 2 to 5, how my invention may be carried out.

The mold proper is made of two halves 2a, with projections such as 5 on its inner wall to constitute the hollow portions 6 of the molded article 7 (Fig. 5).

This mold is intended to cooperate with a core 8, preferably constituted so that it can easily be taken into pieces, and for instance made of two portions 8, 8₁ slidable axially with respect to each other.

The surface of this core is covered with a layer of felt or the like, for instance of uniform thickness.

The mold may be filled with the matter to be molded in any suitable manner, for instance by injection. For articles of relatively small size, each half of the core may be preliminarily filled as it will now be explained.

As a rule, the matter used for making these articles will be of a somewhat pasty consistency, whereby it will be easy to coat the inner wall of the mold with a layer of said matter, which will be more uniformly distributed when the core is fitted in position, and will finally settle under the effect of the vibratory treatment.

Such a matter will be obtained for instance with the following composition:

|  | Kgs. |
|---|---|
| Cement | 3 |
| Asbestos | 0.660 |
| Water | 1.500 |
|  | 5.160 | in which the weight of water is about one half of the weight of cement.

Such a paste, obtained in any suitable stirring machine, is relatively fluid and can be applied by means of a trowel.

One mold half 2a, as shown by Fig. 2, is coated along its inner wall with an approximately uniform layer of matter 1, this matter coming from a mixing machine (for instance through a hopper) and being applied either by means of a trowel or the like or automatically.

The core is then fitted in position, this core including, in the example shown by the drawing, two layers of felt 3 of different diameters corresponding to the respective diameters, also different from each other, of the two portions of the article to be molded. The thickness of the felt layer is suitably chosen in accordance with that of the wall to be obtained, i. e. of the amount of water to be removed.

The other half of the mold is then coated with matter (along its inner wall), after which the two halves are assembled, so as to squeeze the core therebetween, through any suitable means.

The mold is now closed on all sides, except along the felt edge located, in the example shown, near the core operating member 10, which does not matter. Thus the water to be withdrawn from the matter to be molded cannot practically flow out from the mold and will therefore impregnate the felt, making it rigid due to the fact that water is incompressible.

To drive the excess of water from the matter to be molded, the mold is vibrated, which also has the effect of distributing and packing the matter.

This vibratory treatment is advantageously carried out by means of a vibrating plate such as 11 (Fig. 4), the mould being for instance vertical as shown, or brought successively into different positions. The operation may last for about five minutes, for instance.

The article is then withdrawn from the mold and, if necessary, heated in an oven at suitable temperature. In this case, the core is first removed, together with the felt layer it carries. This operation is easy since the core can be taken to pieces. The heating operation may last for instance for one hour, after which unmoulding takes place, the article being finished and ready to be trimmed. If there is no heating, the article must be removed from the mold only after twenty-four hours, since setting is slower.

It should be noted that felt, once impregnated with water, becomes rigid and constitutes the true mould wall. Thus in mold recesses such as that shown at 12, at the upper part of the article, Fig. 2, molding can be obtained by means of a tore-shaped felt part 14 fitting at the end of felt sleeve 3.

What I claim is:

A method of manufacturing an asbestos-cement article having thin walls which comprises forming a mixture of asbestos-cement and water containing a predetermined substantial excess of water, lining the water-tight rigid wall of a mold over at least a portion of its area with a layer of a water absorbing, normally deformable material, the thickness of said layer being chosen to enable it to absorb and be completely filled by the excess of water present in the amount of asbestos-cement mixture that can fill said mold so that the absorbed water held in the lining by the water-tight wall rigidifies said lining, placing said amount of asbestos-cement mixture in said mold, vibrating the mold thus filled to cause said excess of water to pass quickly into said lining while preventing the escape of water from said lining, and removing the molded article from the mold when the asbestos-cement has set and sufficiently hardened.

References Cited in the file of this patent

UNITED STATES PATENTS

| Number | Name | Date |
|---|---|---|
| 2,310,391 | Brooks et al. | Feb. 9, 1943 |
| 2,439,724 | Finley | Apr. 13, 1948 |
| 2,514,484 | Frederick, Jr. | July 11, 1950 |

FOREIGN PATENTS

| Number | Country | Date |
|---|---|---|
| 214,977 | Great Britain | Mar. 5, 1925 |